(12) United States Patent
Solanke et al.

(10) Patent No.: US 11,163,650 B2
(45) Date of Patent: Nov. 2, 2021

(54) PROACTIVE DATA RECOVERY SYSTEM AND METHOD

(71) Applicant: DRUVA INC., Sunnyvale, CA (US)

(72) Inventors: Amar Solanke, Pune (IN); Somesh Jain, Pune (IN); Ramanan Balakrishnan, Fremont, CA (US); Jaspreet Singh, Saratoga, CA (US)

(73) Assignee: Druva Inc., Sunnyvale, CA (US)

( * ) Notice: Subject to any disclaimer, the term of this patent is extended or adjusted under 35 U.S.C. 154(b) by 88 days.

(21) Appl. No.: 16/712,530

(22) Filed: Dec. 12, 2019

(65) Prior Publication Data

US 2021/0073083 A1    Mar. 11, 2021

(30) Foreign Application Priority Data

Sep. 10, 2019 (IN) .............................. 201941036281

(51) Int. Cl.
| | |
|---|---|
| *G06F 11/00* | (2006.01) |
| *G06F 11/14* | (2006.01) |
| *G06F 11/30* | (2006.01) |
| *G06F 21/56* | (2013.01) |
| *G06F 11/34* | (2006.01) |

(52) U.S. Cl.
CPC ...... *G06F 11/1469* (2013.01); *G06F 11/1451* (2013.01); *G06F 11/3034* (2013.01); *G06F 11/3495* (2013.01); *G06F 21/566* (2013.01); *G06F 2201/82* (2013.01); *G06F 2221/034* (2013.01)

(58) Field of Classification Search
CPC ............. G06F 11/1451; G06F 11/1469; G06F 11/3034; G06F 11/3495; G06F 21/566; G06F 2201/82; G06F 2221/034
See application file for complete search history.

(56) References Cited

U.S. PATENT DOCUMENTS

| | | | | |
|---|---|---|---|---|
| 6,223,252 | B1 * | 4/2001 | Bandera | G06F 11/2069 711/112 |
| 9,465,710 | B1 * | 10/2016 | Antony | G06F 11/3055 |
| 9,652,333 | B1 * | 5/2017 | Bournival | G06F 9/45533 |
| 10,467,075 | B1 * | 11/2019 | Chatterjee | G06F 3/0689 |
| 2005/0262385 | A1 * | 11/2005 | McNeill, Jr. | G06F 11/008 714/6.2 |
| 2014/0214767 | A1 * | 7/2014 | Graefe | G06F 11/1451 707/645 |
| 2014/0304548 | A1 * | 10/2014 | Steffan | G06F 11/1088 714/6.23 |

(Continued)

*Primary Examiner* — Joshua P Lottich
(74) *Attorney, Agent, or Firm* — BakerHostetler

(57) ABSTRACT

A proactive data recovery system is provided. The system includes a memory having computer-readable instructions stored therein and a processor configured to execute the computer-readable instructions to access a data storage platform and to monitor a plurality of parameters indicative of a requirement of data restore and/or recovery for the data storage platform. The requirement corresponds to a predicted occurrence of a disaster event. The processor is further configured trigger backup of data stored in the data storage platform based upon the plurality of parameters to create a restore package and to initiate the data restore and/or data recovery operation for the data storage platform using the restore package in response to the occurrence of the disaster event.

20 Claims, 4 Drawing Sheets

(56) References Cited

U.S. PATENT DOCUMENTS

| | | | |
|---|---|---|---|
| 2015/0205657 A1* | 7/2015 | Clark | G06F 11/008 714/47.3 |
| 2015/0286546 A1* | 10/2015 | Brethauer | G06F 11/0727 714/6.3 |
| 2016/0085636 A1* | 3/2016 | Dornemann | G06F 11/1448 707/679 |
| 2016/0239395 A1* | 8/2016 | Madsen | G06F 11/3034 |
| 2017/0046233 A1* | 2/2017 | Shivanna | G06F 11/079 |
| 2018/0081571 A1* | 3/2018 | Akshara | G06F 3/0653 |
| 2018/0365118 A1* | 12/2018 | Fujihara | G06F 3/0619 |
| 2020/0104200 A1* | 4/2020 | Kocberber | G06F 17/18 |
| 2020/0319799 A1* | 10/2020 | Mayer | G06F 3/065 |

* cited by examiner

PROACTIVE DATA RECOVERY SYSTEM AND METHOD

PRIORITY STATEMENT

The present application claims priority under 35 U.S.C. § 119 to Indian patent application number 201941036281 filed 10 Sep. 2019, the entire contents of which are hereby incorporated herein by reference.

FIELD

The invention relates generally to disaster recovery solutions, and more particularly to, a system for proactively keeping data ready for data restore/recovery operations in response to occurrence of a disaster event in a data storage site.

BACKGROUND

Computer systems may be subjected to various failures in disaster events which may result in the loss of data. A disaster event occurs when a site experiences an extensive failure, such as caused by a prolonged power outage, a natural disaster, cyber-attacks, among others.

Recently, cloud services provided by public cloud service providers are being used for data storage. Cloud services provide storage to users in form of a virtualized storage device available via the Internet. In general, users access cloud platforms to store and retrieve data using web services protocols.

Typically, for critical servers/sites when data is backed up and is required to be restored for certain requirements, IT administrator of such sites may have to selectively identify the data that needs to be restored along with the location for data restoration. There may be challenges around identification, triggering restore and monitoring of these activities. Moreover, this process may be cumbersome for site level recovery in case of natural calamities or ransomware attacks. In particular, for enterprise scale organisation, servers/VMs/cloud service could be multiple in number. Currently, IT administrator has to manually trigger such restore and/or recovery operations. This may take substantial amount of time. Further, managing the restore requirement and corresponding trigger, scheduling, resourcing along with its completeness and correctness may become a challenge.

SUMMARY

The following summary is illustrative only and is not intended to be in any way limiting. In addition to the illustrative aspects, example embodiments, and features described, further aspects, example embodiments, and features will become apparent by reference to the drawings and the following detailed description.

Briefly, according to an example embodiment, a proactive data recovery system is provided. The system includes a memory having computer-readable instructions stored therein and a processor configured to execute the computer-readable instructions to access a data storage platform and to monitor a plurality of parameters indicative of a requirement of data restore and/or recovery for the data storage platform. The requirement corresponds to a predicted occurrence of a disaster event. The processor is further configured trigger backup of data stored in the data storage platform based upon the plurality of parameters to create a restore package and to initiate the data restore and/or data recovery operation for the data storage platform using the restore package in response to the occurrence of the disaster event.

According to another example embodiment, a proactive data recovery system is provided. The system includes a disaster prediction module configured to access a data storage platform. The disaster prediction module is configured to monitor a plurality of parameters to predict an occurrence of a disaster event. The system further includes a data restore plan repository configured to store a plurality of data restore action plans. The system also includes a disaster recovery preparation engine configured to dynamically determine a data restore action plan based upon the plurality of parameters and to trigger backup of data stored in the data storage platform in accordance the data restore plan. The system further includes a data backup module configured to create a restore package of the data and a data recovery module configured to initiate the data restore and/or data recovery operation for the data storage platform using the restore package in response to occurrence of the disaster event.

According to another example embodiment, a computer-implemented method for recommending a disaster recovery region of a public cloud service provider is provided. The method includes accessing a data storage platform and monitoring a plurality of parameters indicative of a requirement of data restore and/or recovery for the data storage platform. The requirement corresponds to an occurrence of a disaster event. The method further includes triggering backup of data stored in the data storage platform based upon the plurality of parameters to create a restore package and initiating the data restore and/or data recovery operation for the data storage platform using the restore package in response to the occurrence of the disaster event.

BRIEF DESCRIPTION OF THE FIGURES

These and other features, aspects, and advantages of the example embodiments will become better understood when the following detailed description is read with reference to the accompanying drawings in which like characters represent like parts throughout the drawings, wherein.

DETAILED DESCRIPTION OF EXAMPLE EMBODIMENTS

Figure 1:
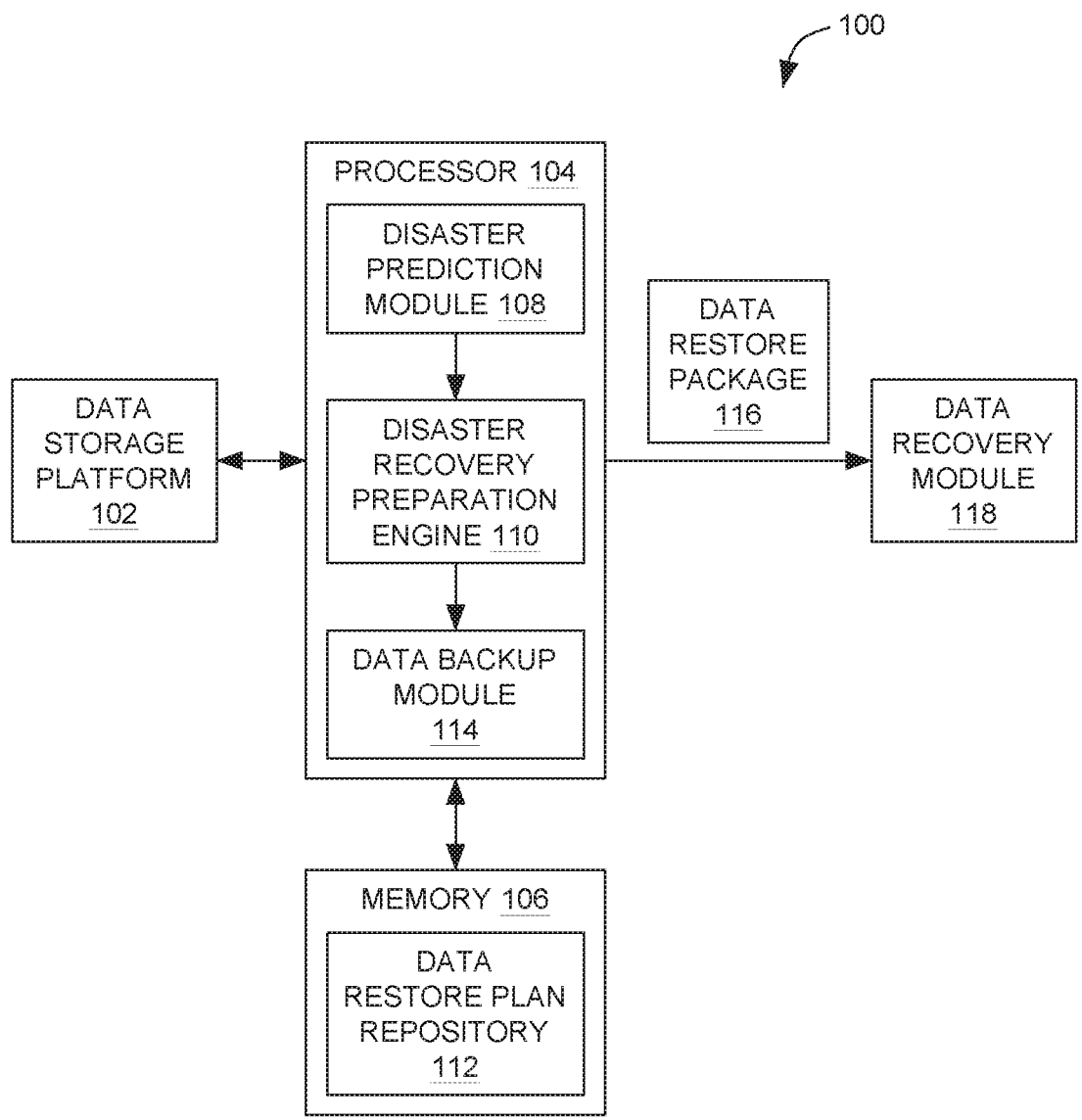
FIG. 1 illustrates a proactive data recovery system for a data storage platform in accordance with embodiments of the present technique.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in many alternate forms and should not be construed as limited to only the example embodiments set forth herein.

Accordingly, while example embodiments are capable of various modifications and alternative forms, example embodiments are shown by way of example in the drawings and will herein be described in detail. It should be understood, however, that there is no intent to limit example embodiments to the particular forms disclosed. On the contrary, example embodiments are to cover all modifications, equivalents, and alternatives thereof. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. Inventive concepts may, however, be embodied in many alternate forms and should not be construed as limited to only the example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Further, although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the scope of inventive concepts.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular example embodiments only and is not intended to be limiting. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in 'addition to the orientation depicted in the figures. For example, if the device in the figures is turned over, elements described as "below" or "beneath" other elements or features would then be oriented "above" the other elements or features. Thus, term such as "below" may encompass both an orientation of above and below. The device may be otherwise oriented (rotated 90 degrees or at other orientations) and the spatially relative descriptors used herein are interpreted accordingly.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The device(s)/apparatus(es), described herein, may be realized by hardware elements, software elements and/or combinations thereof. For example, the devices and components illustrated in the example embodiments of inventive concepts may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A central processing unit may implement an operating system (OS) or one or more software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the central processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

The methods according to the above-described example embodiments of the inventive concept may be implemented with program instructions which may be executed by computer or processor and may be recorded in computer-readable media. The media may also include, alone or in combination with the program instructions, data files, data structures, and the like. The program instructions recorded in the media may be designed and configured especially for the example embodiments of the inventive concept or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter. The described hardware devices may be configured to execute one or more software modules to perform the operations of the above-described example embodiments of the inventive concept, or vice versa.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Example embodiments are generally directed to disaster recovery solutions and more particularly to, a proactive data recovery system that proactively prepares data for restoration in case there is requirement for restore/recovery for disaster of a single server or a site.

FIG. 1 illustrates a proactive data recovery system 100 for a data storage platform 102 in accordance with embodiments of the present technique. The system 100 includes a processor 104, and a memory 106. Each component of the system 100 is described in further detail below.

In the illustrated embodiment, the proactive data recovery system 100 is communicatively coupled to the data storage platform 102 and is configured to facilitate data recovery and/or restoration for the data storage platform 102 in response to occurrence of a disaster event. The data storage platform 102 may include a single server, multiple server, a data storage site, or combinations thereof.

The proactive data recovery system 100 includes a disaster prediction module 108 configured to access the data storage platform 102. The disaster prediction module 108 is configured to monitor a plurality of parameters indicative of a requirement of data restore and/or recovery for the data storage platform 102. The requirement of data restore and/or recovery corresponds to a predicted occurrence of a disaster event. In particular, the disaster prediction module 108 is configured to monitor a plurality of parameters to predict an occurrence of a disaster event at the site of the data storage platform 102. In some examples, the disaster prediction module 108 is configured to monitor parameters corresponding to a plurality of disaster events.

Examples of the disaster events include, but are not limited to, hardware issues of the platform, accessibility of the platform, environmental factors, anomalies in the platform, services failure, or combinations thereof. In one embodiment, the disaster prediction module 108 is configured to monitor parameters corresponding to weather conditions of a location of the data storage platform 102, a natural disaster, detection of ransomware, or combinations thereof. In one example, the disaster prediction module 108 is configured to monitor the parameters associated with one or more inaccessible devices. In another example, the disaster prediction module 108 is configured to monitor parameters indicative of services failures of the data storage platform 102.

In some examples, the disaster prediction module 108 may receive inputs from exogenous sensors or inputs from a monitored data feed. For example, the exogenous sensor may be a seismograph monitor. In another example, the monitored data feed is an internet connection to a national/international tsunami or other disaster warning mechanism.

The disaster prediction module 108 is configured to predict an occurrence of a natural disaster. Examples of natural disaster include, but are not limited to, an earthquake, a hurricane, a tsunami, or combination thereof. The disaster prediction module 108 is configured to predict the disaster event to identify a requirement of data restore and/or recovery for the data storage platform 102.

The proactive data recovery system 100 further includes a disaster recovery preparation engine 110 communicatively coupled to the disaster prediction module 108. The disaster recovery preparation engine 110 is configured to trigger backup of data stored in the data storage platform 102 based upon the plurality of parameters to create a restore package. In this embodiment, the disaster prediction module 108 is configured to access a data restore plan repository 112 having a plurality of data restore action plans. In this example, the plurality of data restore action plans include one or more actions plans corresponding to each of the plurality of disaster events that will be described in detail with reference to FIG. 2.

The disaster prediction module 108 is further configured to dynamically determine a data restore action plan from the plurality of data restore action plans from the based upon the plurality of parameters. Further, the disaster prediction module 108 is further configured to trigger backup of data stored in the data storage platform 102 in accordance with the selected data restore plan. In some examples, the data restore plan repository 112 may be integrated with the memory 106. However, other suitable configurations may be envisaged.

Further, the proactive data recovery system 100 includes a data backup module 114 configured to create a restore package 116 and a data recovery module 118 configured to initiate the data restore and/or data recovery operation for the data storage platform 102 using the restore package 116 in response to occurrence of the disaster event. The data recovery module 118 may transfer the restore package 116 to a public cloud platform, an alternate storage device, an on-premise device, or combinations thereof in accordance with the selected data restore action plan.

Figure 2:
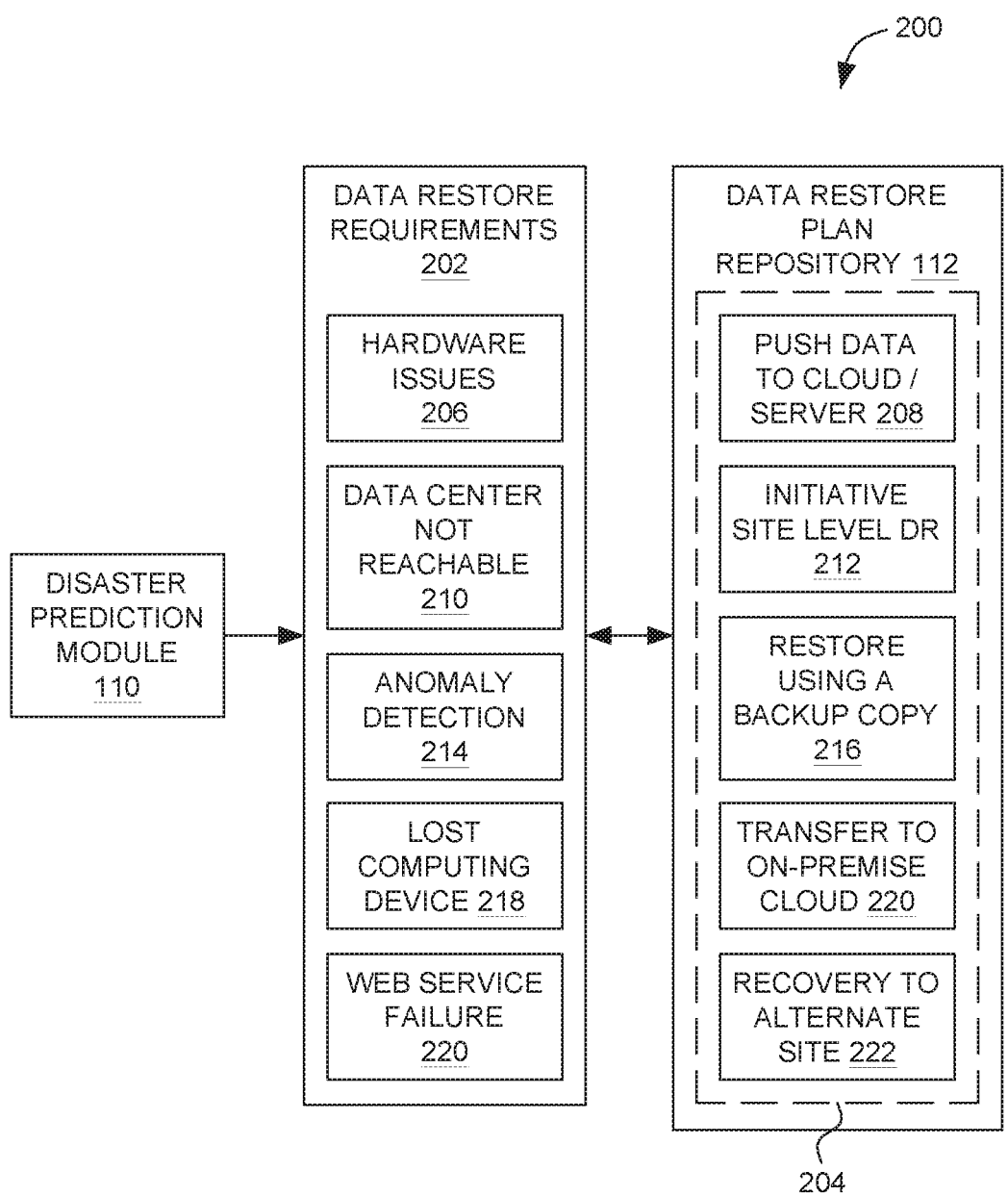
FIG. 2 illustrates example scenarios of data restore and/or recovery requirements identified by the disaster prediction module and corresponding data restore plans stored in the data restore plan repository of the system of FIG. 1.

FIG. 2 illustrates example scenarios 200 of data restore and/or recovery requirements identified by the disaster prediction module 108 and corresponding data restore plans stored in the data restore plan repository 112 of the system 100 of FIG. 1. In this example, the data restore and/or recovery requirements and the corresponding data restore plans are represented by reference numerals 202 and 204. The data restore and/or recovery requirements 202 may be determined by the disaster prediction module 108 based on the monitored parameters. Moreover, the data restore plans 204 may be pre-determined plans stored by a user/client of the system 100. These restore plans may be defined and/or modified on a periodic basis by a user/client of the system 100.

As an example, hardware issues 206 may be identified on a server by the disaster prediction module 108 and the corresponding data restore plan 208 may be selected from the data restore plan repository 112. In this example, the hardware issues 206 may include failure of backups due to disk failures, or identification of critical disk parameters anomalies. Moreover, the data restore plans 208 may include pushing of data of the data storage platform 102 to a local appliance like a cloud cache, copying of the data to an alternate server within same premise of the server, spinning a VM instance on cloud, or combinations thereof.

In another scenario 210, it may be detected that a data-centre is not reachable due to network issues. In some examples, bad weather condition forecast may be detected or potential site shutdowns/power cuts may be predicted. The corresponding action plan 212 may include initiating a site level DR. This may include action plans such as failover for critical servers on cloud, transfer of data to an alternative data center and so forth.

In another example 214, an anomaly may be detected. For example, there may be detection of ransomware. The corresponding action plan 216 may include allocating an alternative server ready for restore using a backup copy stored on the cloud. In some examples, the alternative server can be made available through means such as creation of a VM image/AMI on cloud, restoration of data to another data center, shipping of data to customer using a bulk export device and so forth.

In scenario 218, a stolen or lost computing device such as a laptop or a mobile device may be detected. For example, it may be detected that a device has crossed a specified geo-fenced boundary. In another example, a password may be incorrectly entered for a computing device. Here, action plan 220 may include creation of a virtual desktop on cloud and notifying end-user through email regarding the same. Moreover, a push restore ready image may be transferred an to on-premise cloud cache appliance for speedy recovery.

Moreover, in another scenario 222, a web service failure such as failure of AWS services may be detected. Here, a corresponding action plan 224 may include recovery via backup copy stored and to prepare failback to on-premise site. In an alternate embodiment, the action plan 224 may include preparation for failback to an alternate site either on-premise or restoring data to another cloud platform. As will be appreciated by one skilled in the art, a variety of other scenarios for data restore and/or recovery requirements may be handled by the system 100 of FIG. 1. Based on such scenarios, appropriate data restore plans may be selected and implemented using the data backup module 114. As described before, a restore package may be created and the same may be used for the data restore and/or recovery operations.

Figure 3:
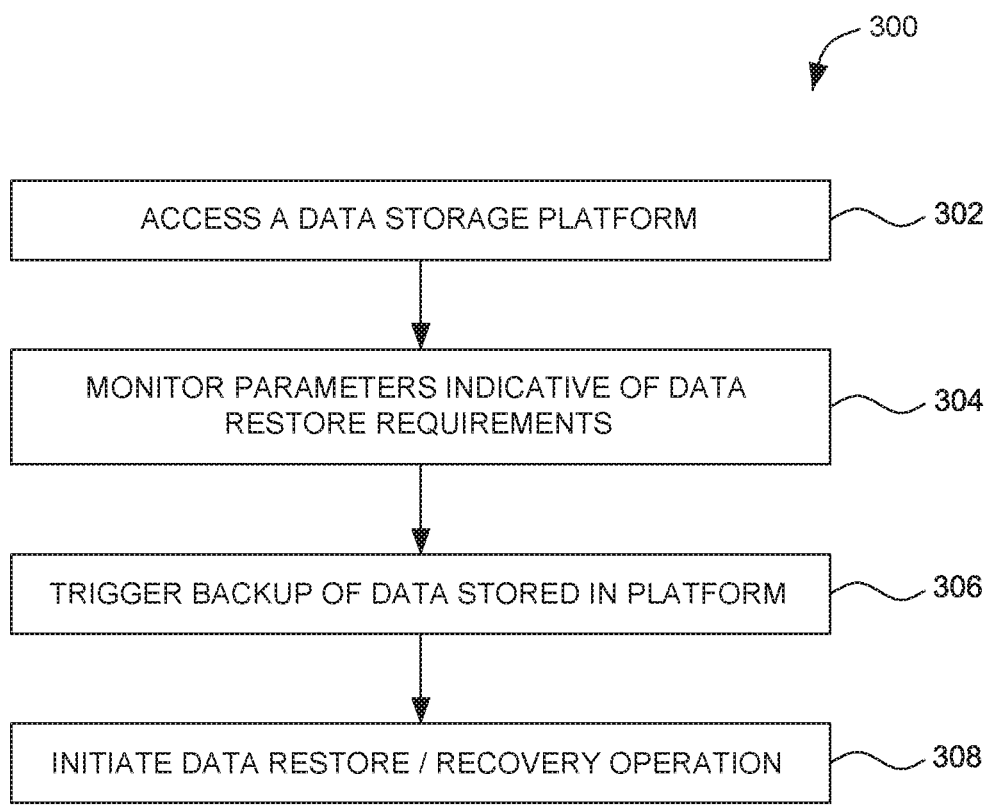
FIG. 3 is a flow diagram for illustrating a process for recommending a disaster recovery region of a public cloud service provider, using the system of FIG. 1, according to the aspects of the present technique.

FIG. 3 is a flow diagram for illustrating a process 300 for recommending a disaster recovery region of a public cloud service provider, using the system 100 of FIG. 1, according to the aspects of the present technique. At block 302, a data storage platform is accessed. At block 304, a plurality of parameters indicative of a requirement of data restore and/or recovery for the data storage platform are monitored. In this example, the requirement of data restore and/or recovery corresponds to an occurrence of a disaster event.

At block 304, backup of data stored in the data storage platform is triggered based upon the plurality of parameter to create a restore package. Further, at block 306, the data restore and/or recovery operation for the data storage platform is initiated using the restore package. The data restore and/or recovery operation for the data storage platform is initiated in response to the occurrence of the disaster event (block 308).

Figure 4:
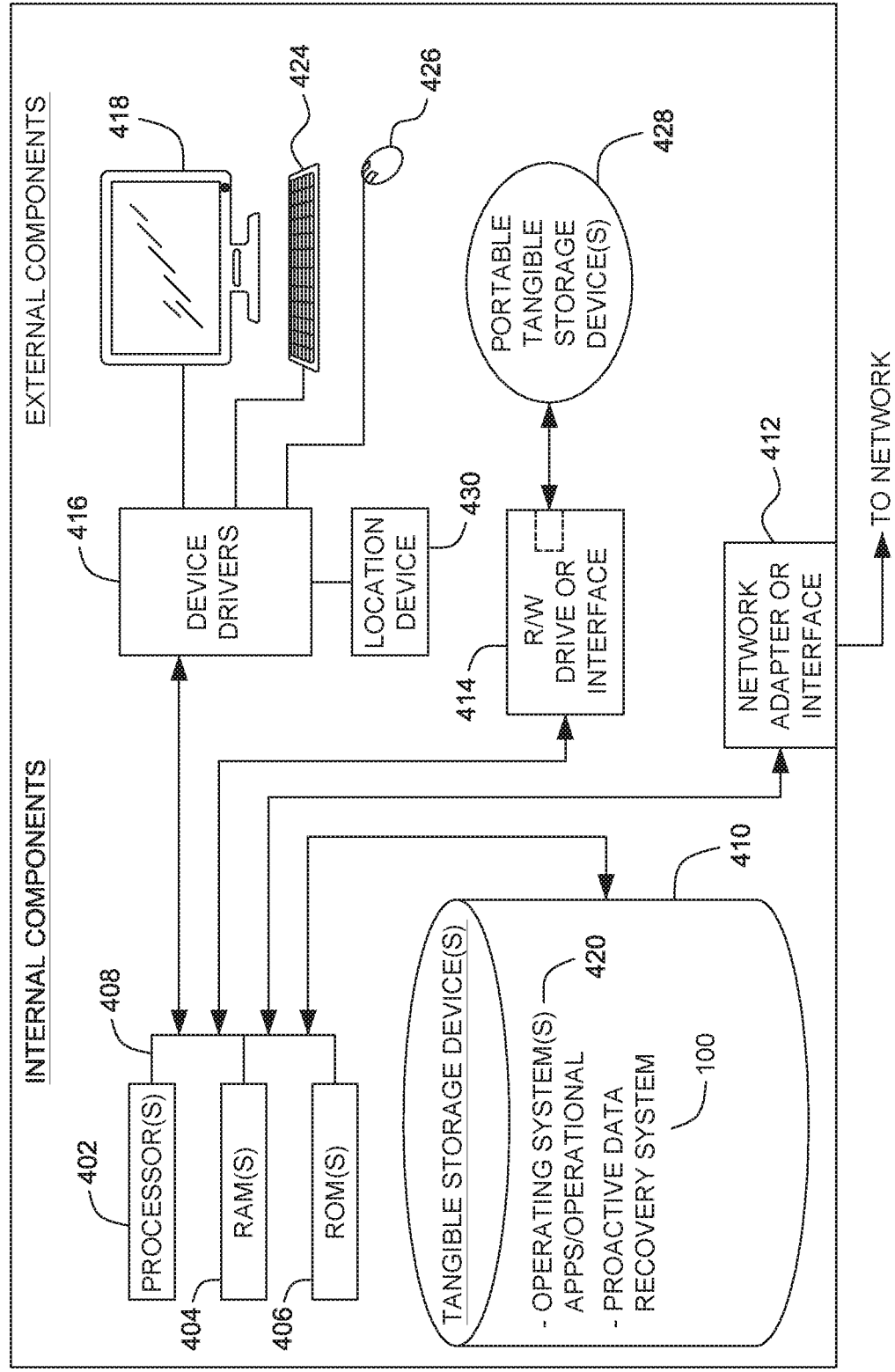
FIG. 4 is a block diagram of an embodiment of a computing device in which the modules of the proactive data recovery system, described herein, are implemented.

The modules of the proactive data recovery system 100 described herein are implemented in computing devices. One example of a computing device 400 is described below in FIG. 4. The computing device includes one or more processor 402, one or more computer-readable RAMs 404 and one or more computer-readable ROMs 406 on one or more buses 508. Further, computing device 400 includes a tangible storage device 410 that may be used to execute operating systems 420 and the proactive data recovery system 100. The various modules of the storage system 100 include a storage site 104, a processor 106, memory 108 and a backup application 110. The processor 106 further includes an indexing module 120. Both, the operating system 420 and the storage system 100 are executed by processor 402 via one or more respective RAMs 404 (which typically includes cache memory). The execution of the operating system 420 and/or the system 100 by the processor 402, configures the processor 402 as a special purpose processor configured to carry out the functionalities of the operation system 420 and/or the proactive data recovery system 100, as described above.

Examples of storage devices 410 include semiconductor storage devices such as ROM 506, EPROM, flash memory or any other computer-readable tangible storage device that may store a computer program and digital information.

Computing device also includes a R/W drive or interface 414 to read from and write to one or more portable computer-readable tangible storage devices 428 such as a CD-ROM, DVD, memory stick or semiconductor storage device. Further, network adapters or interfaces 412 such as a TCP/IP adapter cards, wireless Wi-Fi interface cards, or 3G or 4G wireless interface cards or other wired or wireless communication links are also included in computing device.

In one example embodiment, the system 100 which includes a, a processor 104 with the disaster monitoring module 126 and the disaster recovery recommendation engine 128, and memory 106, may be stored in tangible storage device 410 and may be downloaded from an external computer via a network (for example, the Internet, a local area network or other, wide area network) and network adapter or interface 412.

Computing device further includes device drivers 416 to interface with input and output devices. The input and output devices may include a computer display monitor 418, a keyboard 424, a keypad, a touch screen, a computer mouse 426, and/or some other suitable input device.

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

While only certain features of several embodiments have been illustrated, and described herein, many modifications and changes will occur to those skilled in the art. It is, therefore, to be understood that the appended claims are intended to cover all such modifications and changes as fall within the true spirit of inventive concepts.

The aforementioned description is merely illustrative in nature and is in no way intended to limit the disclosure, its application, or uses. The broad teachings of the disclosure may be implemented in a variety of forms. Therefore, while this disclosure includes particular examples, the true scope of the disclosure should not be so limited since other modifications will become apparent upon a study of the drawings, the specification. It should be understood that one or more steps within a method may be executed in different order (or concurrently) without altering the principles of the present disclosure. Further, although each of the example embodiments is described above as having certain features, any one or more of those features described with respect to any example embodiment of the disclosure may be implemented in and/or combined with features of any of the other embodiments, even if that combination is not explicitly described. In other words, the described example embodiments are not mutually exclusive, and permutations of one or more example embodiments with one another remain within the scope of this disclosure.

The example embodiment or each example embodiment should not be understood as a limiting/restrictive of inventive concepts. Rather, numerous variations and modifications are possible in the context of the present disclosure, in particular those variants and combinations which may be inferred by the person skilled in the art with regard to achieving the object for example by combination or modification of individual features or elements or method steps that are described in connection with the general or specific part of the description and/or the drawings, and, by way of combinable features, lead to a new subject matter or to new method steps or sequences of method steps, including insofar as they concern production, testing and operating methods. Further, elements and/or features of different example embodiments may be combined with each other and/or substituted for each other within the scope of this disclosure.

Still further, any one of the above-described and other example features of example embodiments may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Further, at least one example embodiment relates to a non-transitory computer-readable storage medium comprising electronically readable control information (e.g., computer-readable instructions) stored thereon, configured such that when the storage medium is used in a controller of a magnetic resonance device, at least one example embodiment of the method is carried out.

Even further, any of the aforementioned methods may be embodied in the form of a program. The program may be stored on a non-transitory computer readable medium, such that when run on a computer device (e.g., a processor), cause the computer-device to perform any one of the aforementioned methods. Thus, the non-transitory, tangible computer readable medium is adapted to store information and is adapted to interact with a data processing facility or computer device to execute the program of any of the above mentioned embodiments and/or to perform the method of any of the above mentioned embodiments.

The computer readable medium or storage medium may be a built-in medium installed inside a computer device main body or a removable medium arranged so that it may be separated from the computer device main body. The term computer-readable medium, as used herein, does not encompass transitory electrical or electromagnetic signals propagating through a medium (such as on a carrier wave), the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices), volatile memory devices (including, for example static random access memory devices or a dynamic random access memory devices), magnetic storage media (including, for example an analog or digital magnetic tape or a hard disk drive), and optical storage media (including, for example a CD, a DVD, or a Blu-ray Disc). Examples of the media with a built-in rewriteable non-volatile memory, include but are not limited to memory cards, and media with a built-in ROM, including but not limited to ROM cassettes, etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave), the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices), volatile memory devices (including, for example static random access memory devices or a dynamic random access memory devices), magnetic storage media (including, for example an analog or digital magnetic tape or a hard disk drive), and optical storage media (including, for example a CD, a DVD, or a Blu-ray Disc). Examples of the media with a built-in rewriteable non-volatile memory, include but are not limited to memory cards, and media with a built-in ROM, including but not limited to ROM cassettes, etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which may be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

The invention claimed is:

1. A proactive data recovery system, comprising:
 a memory having computer-readable instructions stored therein;
 a processor configured to execute the computer-readable instructions to:
  access a data storage platform;
  monitor a plurality of parameters indicative of a requirement of data restore and/or data recovery operation for the data storage platform, wherein the requirement corresponds to a predicted occurrence of a disaster event;
  trigger backup of data stored in the data storage platform based upon the plurality of parameters to create a restore package;
  initiate the data restore and/or data recovery operation for the data storage platform using the restore package in response to the occurrence of the disaster event;
  access a data restore plan repository to determine one or more data restore action plans based on the plurality of parameters; and
  implement the one or more data restore action plans for the data storage platform.

2. The system of claim 1, wherein the processor is configured to execute the computer-readable instructions to monitor the parameters corresponding to hardware issues of the platform, accessibility of the platform, environmental factors, anomalies, services failure, or combinations thereof.

3. The system of claim 2, wherein the processor is configured to execute the computer-readable instructions to monitor the parameters associated with weather conditions of a location of the data storage site, natural disaster, or combinations thereof.

4. The system of claim 3, wherein the processor is configured to execute the computer-readable instructions to monitor the parameters associated with occurrence of an earthquake, a hurricane, a tsunami, or combinations thereof.

5. The system of claim 2, wherein the processor is configured to execute the computer-readable instructions to monitor the parameters associated with detection of ransomware.

6. The system of claim 2, wherein the processor is configured to execute the computer-readable instructions to monitor the parameters associated with one or more inaccessible devices.

7. The system of claim 2, wherein the processor is configured to execute the computer-readable instructions to monitor parameters indicative of services failures of the data storage platform.

8. The system of claim 1, wherein the processor is further configured to execute the computer-readable instructions to initiate the data restore and/or data recovery operation using a cloud platform, a server, a network storage device, an alternate data center, or combinations thereof.

9. The system of claim 1, wherein the processor is further configured to transfer the restore package to a public cloud platform, an alternate storage device, an on-premise device, or combinations thereof in accordance with the data restore action plan.

10. A proactive data recovery system comprising:
a disaster prediction module configured to access a data storage platform, wherein the disaster prediction module is configured to monitor a plurality of parameters to predict an occurrence of a disaster event;
a data restore plan repository configured to store a plurality of data restore action plans;
a disaster recovery preparation engine configured to dynamically determine a data restore action plan based upon the plurality of parameters and to trigger backup of data stored in the data storage platform in accordance the data restore action plan;
a data backup module configured to create a restore package of the data; and
a data recovery module configured to initiate the data restore action plan for the data storage platform using the restore package in response to occurrence of the disaster event.

11. The system of claim 10, wherein the disaster prediction module is configured to predict the disaster event to identify a requirement of data restore action plan for the data storage platform.

12. The system of claim 11, wherein the disaster prediction module is configured to monitor parameters corresponding to a plurality of disaster events, wherein the disaster events comprise hardware issues of the platform, accessibility of the platform, environmental factors, anomalies in the platform, services failure, or combinations thereof.

13. The system of claim 12, wherein the disaster prediction module is configured to monitor parameters corresponding to weather conditions of a location of the data storage site, natural disaster, detection of ransomware, or combinations thereof.

14. The system of claim 12, wherein the plurality of data restore action plans comprises one or more action plans corresponding to each of the plurality of disaster events.

15. The system of claim 14, wherein the data recovery module is configured to transfer the restore package to a public cloud platform, an alternate storage device, an on-premise device, or combinations thereof in accordance with the data restore action plan.

16. A computer-implemented method for recommending a disaster recovery region of a public cloud service provider, the method comprising:
accessing a data storage platform;
monitoring a plurality of parameters indicative of a requirement of data restore and/or data recovery operation for the data storage platform, wherein the requirement corresponds to an occurrence of a disaster event;
triggering backup of data stored in the data storage platform based upon the plurality of parameters to create a restore package;
initiating the data restore and/or data recovery operation for the data storage platform using the restore package in response to the occurrence of the disaster event;
accessing a data restore plan repository to determine one or more data restore action plans based on the plurality of parameters; and
implementing the one or more data restore action plans for the data storage platform.

17. The computer-implemented method of claim 16, further comprising monitoring the parameters corresponding to hardware issues of the platform, accessibility of the platform, environmental factors, anomalies in the platform, services failure, or combinations thereof.

18. The computer-implemented method of claim 16, further comprising transferring the restore package to a public cloud platform, an alternate storage device, an on-premise device, or combinations thereof in accordance with the data restore action plan.

19. The computer-implemented method of claim 16, further comprising proactively creating the restore package to enhance efficiency of the data restore action plan for the data storage platform in response to occurrence of the disaster event.

20. The computer-implemented method of claim 16, wherein monitoring the plurality of parameters indicative of the requirement of data restore and/or data recovery for the data storage platform comprises monitoring parameters corresponding to hardware issues of the platform, accessibility of the platform, environmental factors, anomalies, services failure, or combinations thereof.

* * * * *